(12) United States Patent
Nardi et al.

(10) Patent No.: US 10,913,129 B2
(45) Date of Patent: Feb. 9, 2021

(54) ADDITIVE MANUFACTURING AN OBJECT FROM MATERIAL WITH A SELECTIVE DIFFUSION BARRIER

(71) Applicant: United Technologies Corporation, Farmington, CT (US)

(72) Inventors: Aaron T. Nardi, East Granby, CT (US); Zissis Dardas, Worcester, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 649 days.

(21) Appl. No.: 15/111,389

(22) PCT Filed: Jan. 22, 2015

(86) PCT No.: PCT/US2015/012484
§ 371 (c)(1),
(2) Date: Jul. 13, 2016

(87) PCT Pub. No.: WO2015/112733
PCT Pub. Date: Jul. 30, 2015

(65) Prior Publication Data
US 2016/0332253 A1     Nov. 17, 2016

Related U.S. Application Data

(60) Provisional application No. 61/931,329, filed on Jan. 24, 2014.

(51) Int. Cl.
*B23K 26/00* (2014.01)
*B33Y 70/00* (2020.01)
(Continued)

(52) U.S. Cl.
CPC ............ *B23K 26/0006* (2013.01); *B22F 1/02* (2013.01); *B22F 3/1055* (2013.01);
(Continued)

(58) Field of Classification Search
CPC ............ B23K 26/0006; B23K 26/342; B23K 26/144; B23K 2203/52; B33Y 10/00; B33Y 70/00
(Continued)

(56) References Cited

U.S. PATENT DOCUMENTS 4,291,070 A    9/1981  Brown et al.
5,182,170 A *  1/1993  Marcus .................. B22F 3/004
                                              156/272.8
(Continued)

FOREIGN PATENT DOCUMENTS

EP     2743361 A1 *  6/2014  ............ C22C 38/58
JP     03099401        4/1991

OTHER PUBLICATIONS

EP search report for EP15740948.4 dated Jan. 31, 2017.

*Primary Examiner* — Thien S Tran
(74) *Attorney, Agent, or Firm* — Getz Balich LLC

(57) ABSTRACT

A manufacturing process is provided in which material is supported within a chamber. This material includes a plurality of discrete metal particles and ceramic disposed between at least some of the metal particles. At least a portion of the material is solidified together using an additive manufacturing system to form an object.

12 Claims, 8 Drawing Sheets

(51) Int. Cl.
  *B33Y 10/00* (2015.01)
  *C04B 35/628* (2006.01)
  *C04B 35/488* (2006.01)
  *C04B 35/117* (2006.01)
  *C04B 35/46* (2006.01)
  *B33Y 30/00* (2015.01)
  *B22F 1/02* (2006.01)
  *B22F 3/105* (2006.01)
  *B23K 26/144* (2014.01)
  *B23K 26/342* (2014.01)
  *B23K 103/08* (2006.01)
  *B23K 103/00* (2006.01)

(52) U.S. Cl.
  CPC .......... *B23K 26/144* (2015.10); *B23K 26/342* (2015.10); *B33Y 10/00* (2014.12); *B33Y 30/00* (2014.12); *B33Y 70/00* (2014.12); *C04B 35/117* (2013.01); *C04B 35/46* (2013.01); *C04B 35/488* (2013.01); *C04B 35/62813* (2013.01); *C04B 35/62821* (2013.01); *C04B 35/62823* (2013.01); *B23K 2103/08* (2018.08); *B23K 2103/52* (2018.08); *C04B 2235/404* (2013.01); *Y02P 10/25* (2015.11)

(58) Field of Classification Search
  USPC ............. 219/121.63, 121.64, 121.65, 121.86
  See application file for complete search history.

(56) References Cited

U.S. PATENT DOCUMENTS

| | | | |
|---|---|---|---|
| 5,266,098 A | 11/1993 | Chun et al. | |
| 5,372,845 A * | 12/1994 | Rangaswamy | B22F 9/04 427/216 |
| 6,046,426 A * | 4/2000 | Jeantette | B01F 13/0255 219/121.63 |
| 6,405,095 B1 | 6/2002 | Jang et al. | |
| 7,789,037 B2 | 9/2010 | Teulet | |
| 8,383,985 B2 | 2/2013 | Twelves, Jr. et al. | |
| 8,488,944 B2 | 7/2013 | Takehi | |
| 2002/0031603 A1* | 3/2002 | Miyamoto | C23C 26/00 427/191 |
| 2003/0010409 A1* | 1/2003 | Kunze | B22F 3/1055 148/513 |
| 2004/0156772 A1* | 8/2004 | Sundberg | C01B 21/0602 423/324 |
| 2005/0064679 A1 | 3/2005 | Farnworth et al. | |
| 2006/0090699 A1* | 5/2006 | Muller | C23C 4/12 118/715 |
| 2007/0202351 A1 | 8/2007 | Justin et al. | |
| 2009/0200275 A1 | 8/2009 | Twelves, Jr. et al. | |
| 2010/0310404 A1 | 12/2010 | Ackelid | |
| 2011/0076587 A1* | 3/2011 | Wang | B22F 1/0088 429/465 |
| 2012/0164322 A1 | 6/2012 | Teulet | |
| 2012/0228807 A1 | 9/2012 | Teulet | |
| 2012/0234671 A1 | 9/2012 | Ackelid | |
| 2013/0140279 A1* | 6/2013 | Bruck | B23K 26/082 219/73.11 |
| 2013/0277891 A1 | 10/2013 | Teulet | |
| 2013/0292081 A1* | 11/2013 | Hosek | B22D 23/00 164/46 |
| 2013/0307201 A1 | 11/2013 | McEnerney | |
| 2014/0163717 A1* | 6/2014 | Das | C30B 19/10 700/119 |
| 2014/0314964 A1* | 10/2014 | Ackelid | B05D 3/068 427/496 |
| 2015/0125335 A1* | 5/2015 | Bruck | B23K 26/127 419/26 |
| 2015/0307968 A1* | 10/2015 | Mars | B23K 35/308 219/76.1 |

\* cited by examiner

ADDITIVE MANUFACTURING AN OBJECT FROM MATERIAL WITH A SELECTIVE DIFFUSION BARRIER

This application claims priority to PCT patent application Ser. No. PCT/US15/012484 filed Jan. 22, 2015 which claims priority to U.S. patent application Ser. No. 61/931,329 filed Jan. 24, 2014, which are hereby incorporated herein by reference in their entireties.

BACKGROUND OF THE INVENTION

1. Technical Field

This disclosure relates to systems and processes for additive manufacturing one or more objects.

2. Background Information

Various additive manufacturing processes are known in the art for forming a part. The term "additive manufacturing" may describe a process where a part is formed by accumulating and/or fusing material together, typically in a layer-on-layer manner Layers of powder material, for example, may be disposed and thereafter solidified sequentially onto one another to form the part. The term "solidify" may describe a process whereby material is melted thereby causing discrete particles of the melted material to fuse together.

Before solidification, the deposited powder material may be heated to an elevated temperature. In this manner, an energy beam (e.g., an electron beam) may be used to slightly elevate the temperature of a select portion of the powder material above its melting point in order to melt and fuse the respective powder material together. At such elevated temperatures, however, other portions of the heated powder material, particularly portions adjacent or proximate the energy beam, may uncontrollably sinter together. Such uncontrolled sintering may create pores near the surface of the part. The uncontrolled sintering may also or alternatively necessitate additional and/or lengthen existing post additive manufacturing finishing processes; e.g., machining processes.

There is a need in the art for improved additive manufacturing systems and processes.

SUMMARY OF THE DISCLOSURE

According to an aspect of the invention, a manufacturing process is provided in which material is supported within a chamber. This material includes a plurality of discrete metal particles and ceramic disposed between at least some of the metal particles. At least a portion of the material is solidified together using an additive manufacturing system to form an object.

According to another aspect of the invention, a manufacturing process is provided in which material is provided that includes a plurality of particles and a substance. The substance at least partially separates at least some of the particles. At least a portion of the material is fused together to form an object using an energy beam, which is generated by an additive manufacturing system. A melting point of the substance is higher than a melting point of the particles.

According to another aspect of the invention, an additive manufacturing system is provided that includes a distribution device, a solidification device and a housing with an internal chamber. The distribution device is adapted to deposit a plurality of particles within the chamber. The distribution device is also adapted to deposit a substance within the chamber between at least some of the particles, wherein the particles and the substance are included in the material. The solidification device is adapted to solidify at least a portion of the material together to additive manufacture an object.

The ceramic may substantially inhibit the metal particles from sintering together. For example, the ceramic may substantially inhibit the metal particles from sintering together in locations where an energy beam does not (e.g., directly) pass over those locations. However, in locations where the energy beam passes (e.g., directly) over, the ceramic particles may substantially be displaced or otherwise allow metallic bonding between the metal particles with minimal included ceramic particles.

A first of the metal particles may be at least partially encased by a coating of the ceramic.

During the process, a material particle may be directed into the chamber. This material particle may include the first of the metal particles, which is at least partially encased by the coating of the ceramic.

During the process, the first of the metal particles may be at least partially encased with the coating of the ceramic within the chamber.

The ceramic may include a plurality of discrete ceramic particles. The material may include a mixture of the metal particles with the ceramic particles.

A mass fraction of the ceramic within the material may be substantially equal to or less than about five percent. More particularly, the mass fraction of the ceramic within the material may be substantially equal to or less than about one percent.

A melting point of the ceramic may be higher than a melting point of the metal particles.

During the process, at least some of the metal particles may be fused together using an energy beam generated by the additive manufacturing system to solidify the material.

A first of the particles may be composed of or otherwise include metal.

The substance may be composed of or otherwise include non-metal.

The substance may be composed of or otherwise include ceramic.

A first of the particles may be at least partially encased by a coating of the substance.

The particles may be first particles. The substance may include a plurality of discrete second particles. The material may include a substantially homogeneous mixture of the first particles with the second particles.

The distribution device may be adapted to mix the particles with a plurality of second particles, which are included in the substance, to deposit the substance between at least some of the particles.

The distribution device may be adapted to at least partially encase a first of the particles with a coating of the substance within the chamber.

The solidification device may be adapted to generate an energy beam for solidifying the at least a portion of the material.

The foregoing features and the operation of the invention will become more apparent in light of the following description and the accompanying drawings.

DETAILED DESCRIPTION OF THE INVENTION

Figure 1:
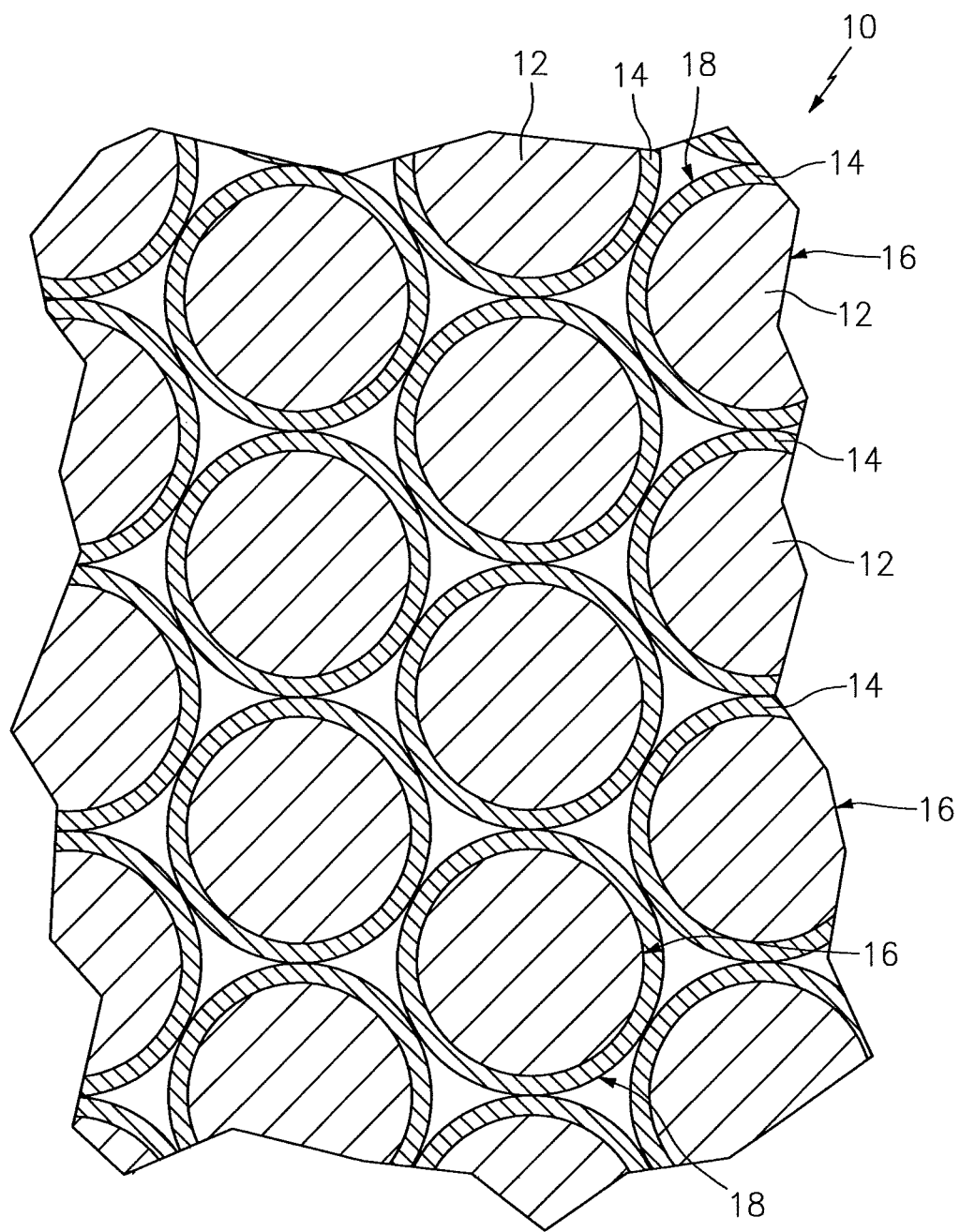
FIGS. 1-3 are sectional illustrations of respective additive manufacturing materials.
Figure 2:
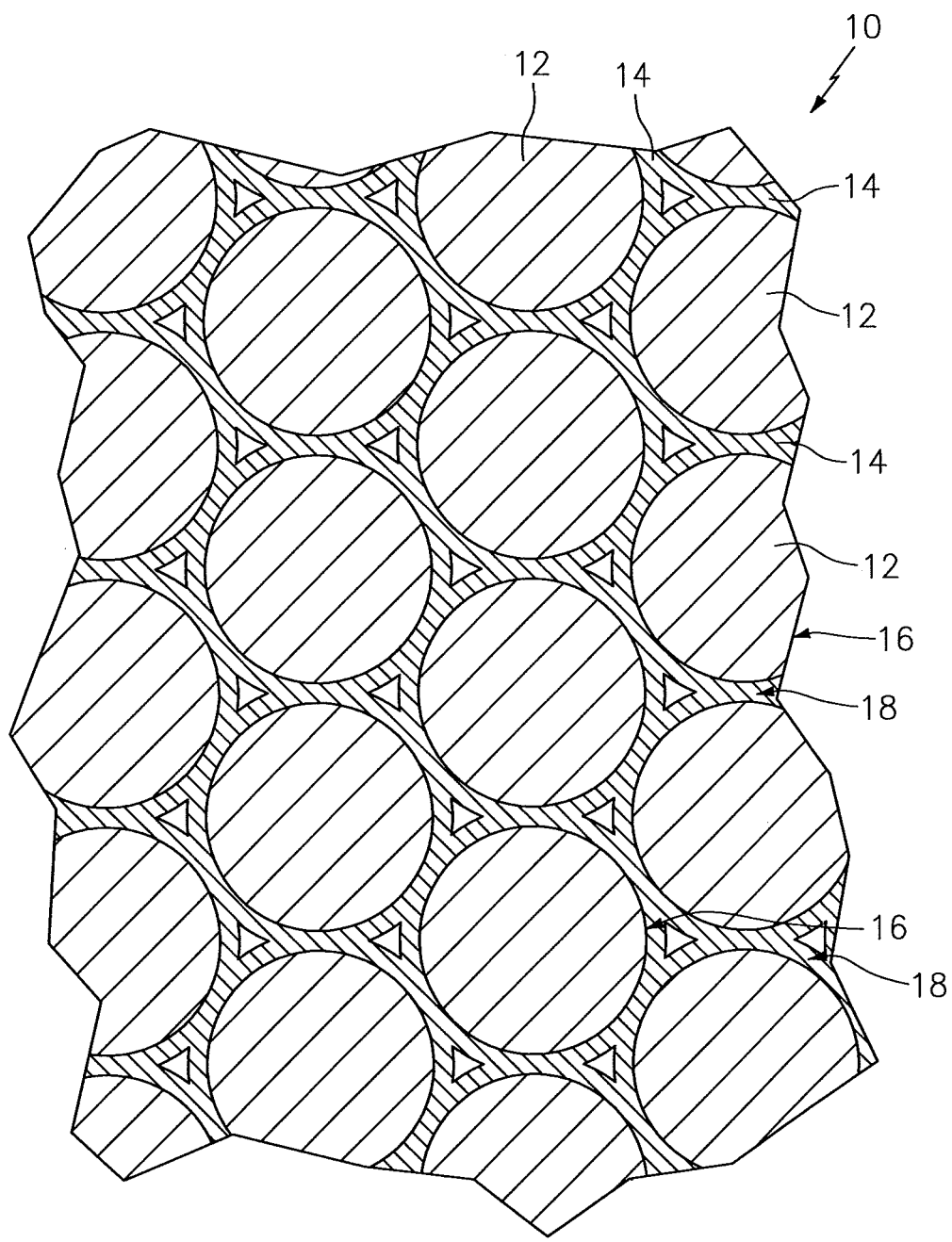
Figure 3:
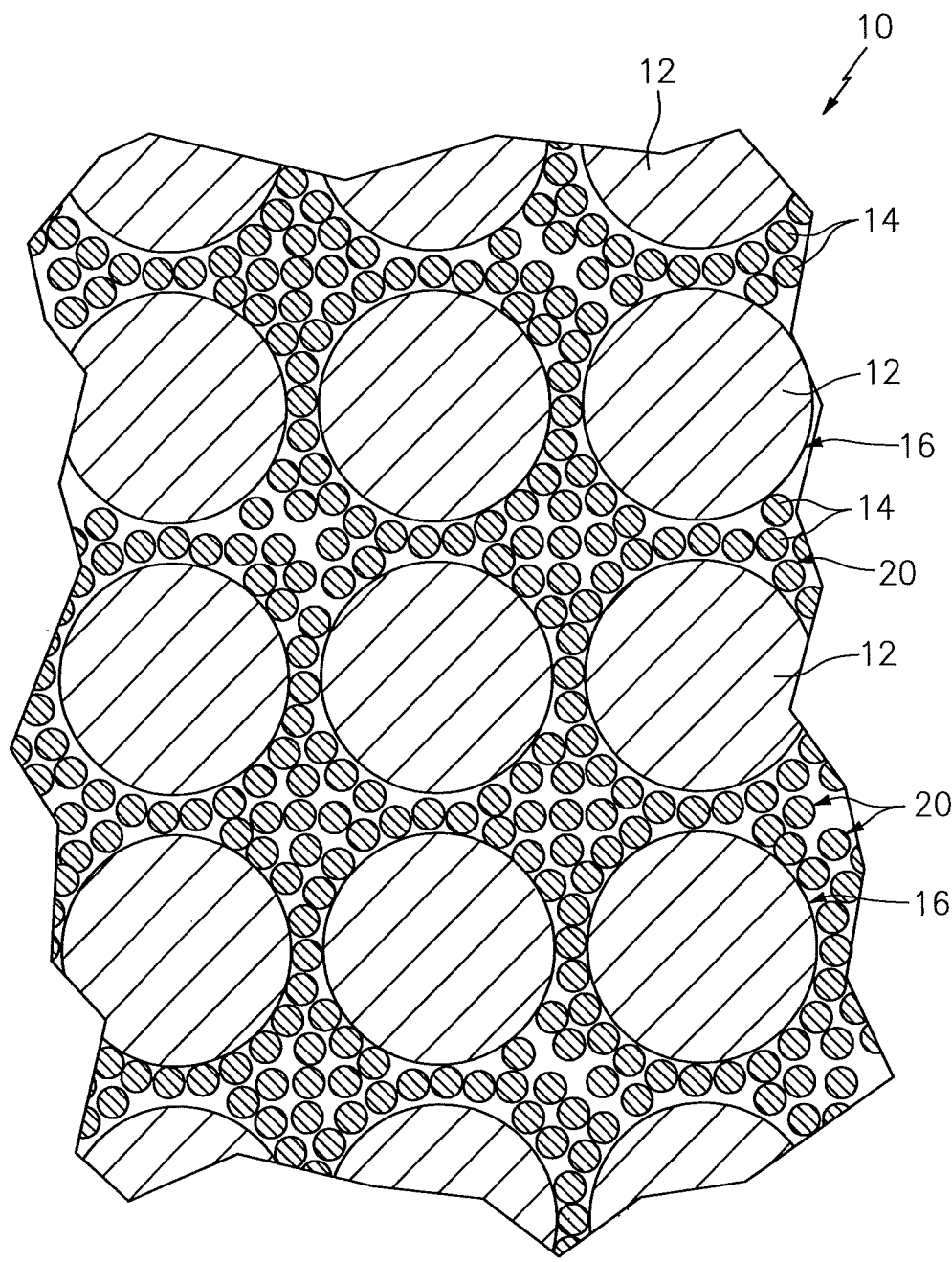

FIGS. 1-3 illustrate exemplary embodiments of material 10 for additive manufacturing one or more parts. This additive manufacturing material 10 includes a first substance 12 and a second substance 14.

The first substance 12 may account for a bulk mass of the material 10 and, thus, the part(s) formed therefrom. A mass fraction of the first substance 12 within the material 10, for example, may be substantially equal to or greater than about ninety-five percent (95%). Alternatively, the mass fraction of the first substance 12 within the material 10 may be substantially equal to or greater than about ninety-nine percent (99%).

The first substance 12 may be configured as a plurality of discrete particles 16 (e.g., powder) within the material 10. The first substance particles 16 may have substantially uniform or varying sizes; e.g., average diameters. The particle size of one or more of the first substance particles 16 may be between about five micrometers (5 μm) and about five-hundred micrometers (500 μm); e.g., between about twenty micrometers (20 μm) and about seventy micrometers (70 μm).

The first substance 12 may be composed of or otherwise include one or more metals. Examples of such metals include, but are not limited to, aluminum (Al), copper (Cu), titanium (Ti), nickel (Ni), vanadium (V), chromium (Cr), and/or alloys of one or more of the foregoing metals. The first substance 12 may also or alternatively be composed of or otherwise include one or more non-metals; e.g., ceramics. Examples of such non-metals include, but are not limited to, aluminum oxide, hafnium oxide, zirconium oxide and/or titanium oxide.

The second substance 14 may be operable to substantially inhibit or significantly reduce uncontrolled fusing (e.g., sintering) of some or all the first substance particles 16 together before, for example, application of a solidification energy beam thereto. More particularly, the second substance 14 may form a selective diffusion barrier between some or all of the first substance particles 16 where, for example, the material 10 is at a temperature below a melting point of the first substance 12 (or the second substance 14). The term "diffusion barrier" may describe a substance that substantially prevents atoms from each first substance particle 16 from diffusing into a neighboring first substance particle 16.

The second substance 14 is configured within the material 10 between and thereby partially or completely separating at least some or all neighboring first substance particles 16. For example, referring to FIGS. 1 and 2, one or more of the first substance particles 16 may each be completely (or partially) encased within a coating 18 of the second substance 14. This second substance coating 18 may be applied to the first substance particles 16 through, for example, chemical adsorption, physical adsorption and/or covalent bonding. The second substance coating 18 may be applied to the first substance particles 16 before additive manufacturing. Alternatively, the second substance coating 18 may be applied to the first substance particles 16 during additive manufacturing as described below in further detail.

Referring to FIG. 3, the second substance 14 may also or alternatively be configured as a plurality of discrete particles 20 (e.g., powder) within the material 10. These second substance particles 20 may be homogeneously or heterogeneously mix with the first substance particles 16 to provide the diffusion barrier. The first and the second substance particles 16 and 20 may be mixed before additive manufacturing. Alternatively, the first and the second substance particles 16 and 20 may be mixed during additive manufacturing as described below in further detail.

The second substance may also or alternatively be grown on the first substance particles 16 (e.g., metal particles) from exposure of the first substance particles 16 to sufficient environmental condition. This may occur due to high levels of an alloying element in the metal. Aluminum alloyed into an iron or nickel based alloy, for example, may be subjected to a slightly oxidizing environment in a controlled manner to grow a film of aluminum oxide on the surface of the first substance particles 16.

The second substance particles 20 may have substantially uniform or varying sizes; e.g., average diameters. The particle size of one or more of the second substance particles 20 may be between about five micrometers (5 μm) and about five-hundred micrometers (500 μm); e.g., between about twenty micrometers (20 μm) and about ninety micrometers (90 μm).

Referring to FIGS. 1-3, a mass fraction of the second substance 14 within the material 10 may be substantially equal to or less than about five percent (5%). In this manner, the second substance 14 may form relatively few or no inclusions within the solidified material. Alternatively, the mass fraction of the second substance 14 within the material 10 may be substantially equal to or less than about one percent (1%). In this manner, the second substance 14 may not significantly alter the chemical (e.g., metallurgical) properties of the first substance 12 and/or the desired properties for the part(s). It is worth noting, the thickness of the second substance coating 18 of FIGS. 1 and 2 and the size of the second substance particles 20 of FIG. 3 are exaggerated for ease of illustration.

The second substance 14 may have a melting point that is higher than a melting point of the first substance 12. The second substance 14 may be composed of or otherwise include one or more non-metals; e.g., ceramics. Examples of such non-metal(s) include, but are not limited to, aluminum oxide, hafnium oxide, zirconium oxide and/or titanium oxide. The second substance 14 may also or alternatively be composed of or otherwise include one or more metals. Examples of such metals include, but are not limited to, relatively high melting point refractory materials such as molybdenum, tungsten, tantalum and/or niobium.

Figure 4:
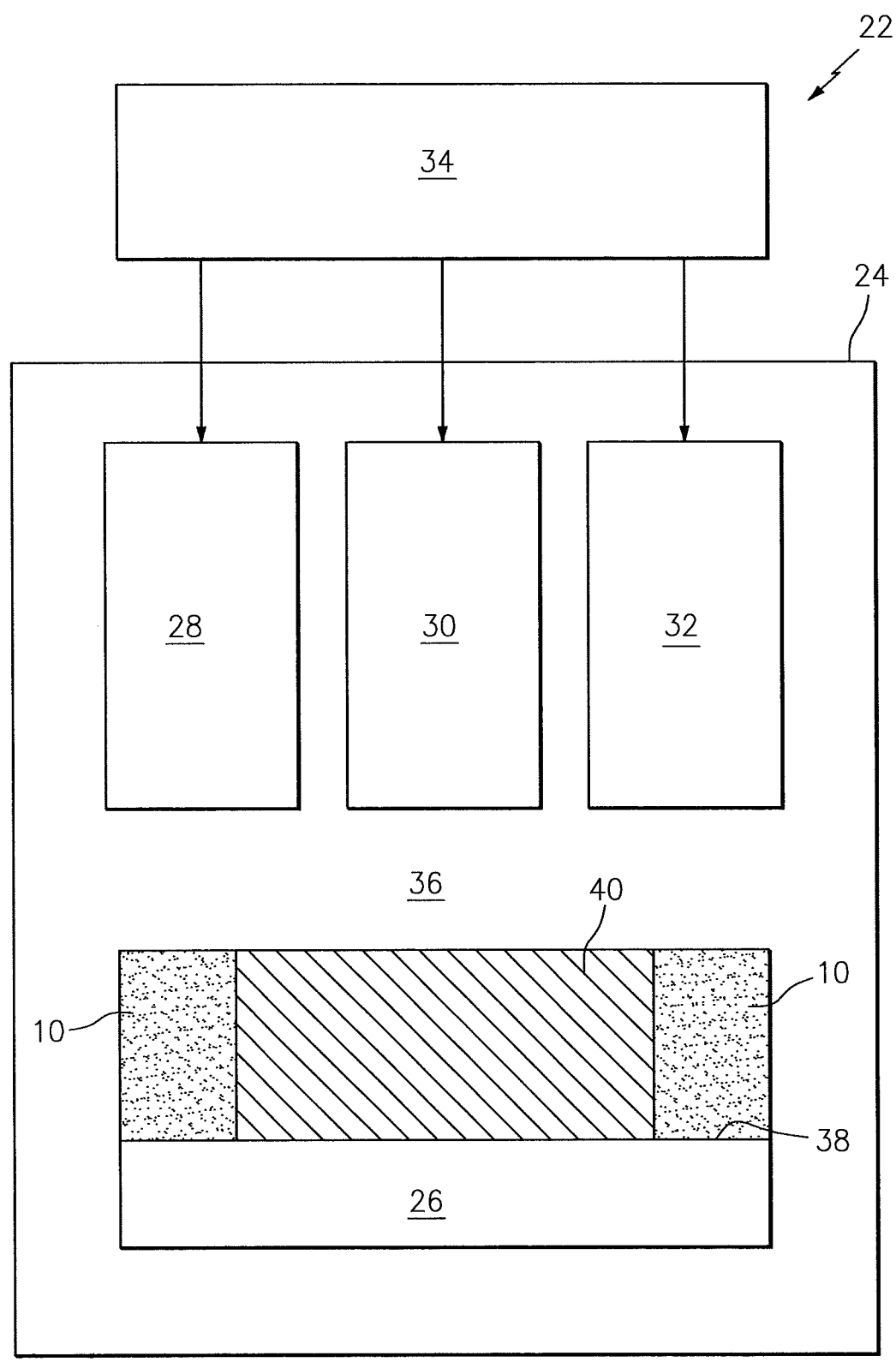
FIG. 4 is a block diagram of a system for additive manufacturing at least one part.

FIG. 4 is a block diagram of a system 22 for additive manufacturing at least one part using additive manufacturing material such as the material 10. This additive manufacturing system 22 includes a housing 24, a base 26, a material distribution device 28, a heater 30 and a material solidification device 32. The additive manufacturing system 22 also includes a controller 34 in signal communication (e.g., hardwired and/or wirelessly coupled) with one or more of the system components 28, 30 and 32.

The housing 24 may be configured as a sealed enclosure or pressure vessel. The housing 24 includes one or more walls that form an internal chamber 36, in which at least a portion of one or more of the system components 26, 28, 30 and 32 may be located. The chamber 36 may be a sealed chamber such as, for example, a vacuum chamber.

The base 26 includes a support surface 38. This support surface 38 is adapted to support the material 10 (e.g., powder) during manufacture of the part. The support surface 38 is also or alternatively adapted to support at least one object 40 that is formed, for example, from a solidified portion of the material. The support surface 38, for example, may be substantially horizontal relative to gravity. The support surface 38 may also have a generally planar geometry.

It is worth noting, depending upon the specific step during manufacture, the object 40 supported by the base 26 may be a semi-additive manufactured part or a complete additive manufactured part. The term "semi-additive manufactured" may describe an object which requires additional material buildup before taking on a general geometry of a finished part. In contrast, the term "complete additive manufactured" may describe an object for which material buildup is substantially complete and/or that has a general geometry of the finished part.

The distribution device 28 is adapted to deposit or otherwise provide a quantity of the material 10 onto the support surface 38. This quantity of material 10 may be deposited in a substantially uniform layer over at least a portion or all of the support surface 38.

Figure 5:
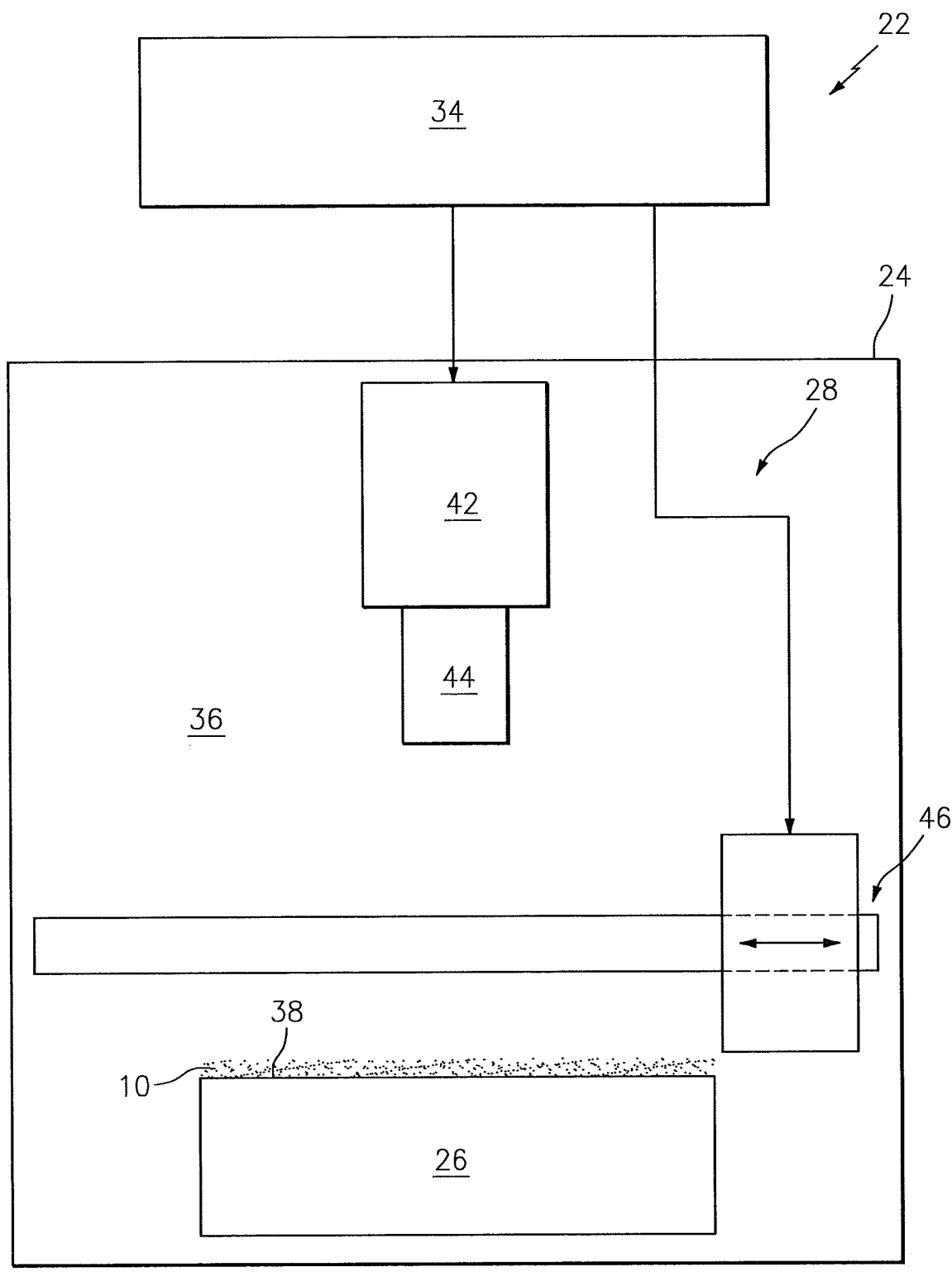
FIGS. 5-7 are block diagrams of respective material distribution devices for the system of FIG. 4.

Referring to FIG. 5, the distribution device 28 may include a material reservoir 42 (e.g., a hopper), a material outlet 44 (e.g., a conduit) and a material coater 46 (e.g., a blade). The reservoir 42 is adapted to contain a quantity of material (e.g., the material 10). This material may include a plurality of combined first and second substance particles 16 and 20 (e.g., material particles) as illustrated in FIG. 1. The material may also or alternatively include a mixture of the first substance particles 16 and the second substance particles 20 as illustrated in FIG. 3. Referring again to FIG. 5, the reservoir 42 may also be adapted to mix the material 10 where, for example, the first and the second substances 12 and 14 are received as discrete powders. The outlet 44 is adapted to direct the material 10 from the reservoir 42 onto the support surface 38 into a mound (or mounds). The coater 46 is adapted to spread the mound (or mounds) of material 10 across at least a portion of the support surface 38 to provide the layer of material 10.

Figure 6:
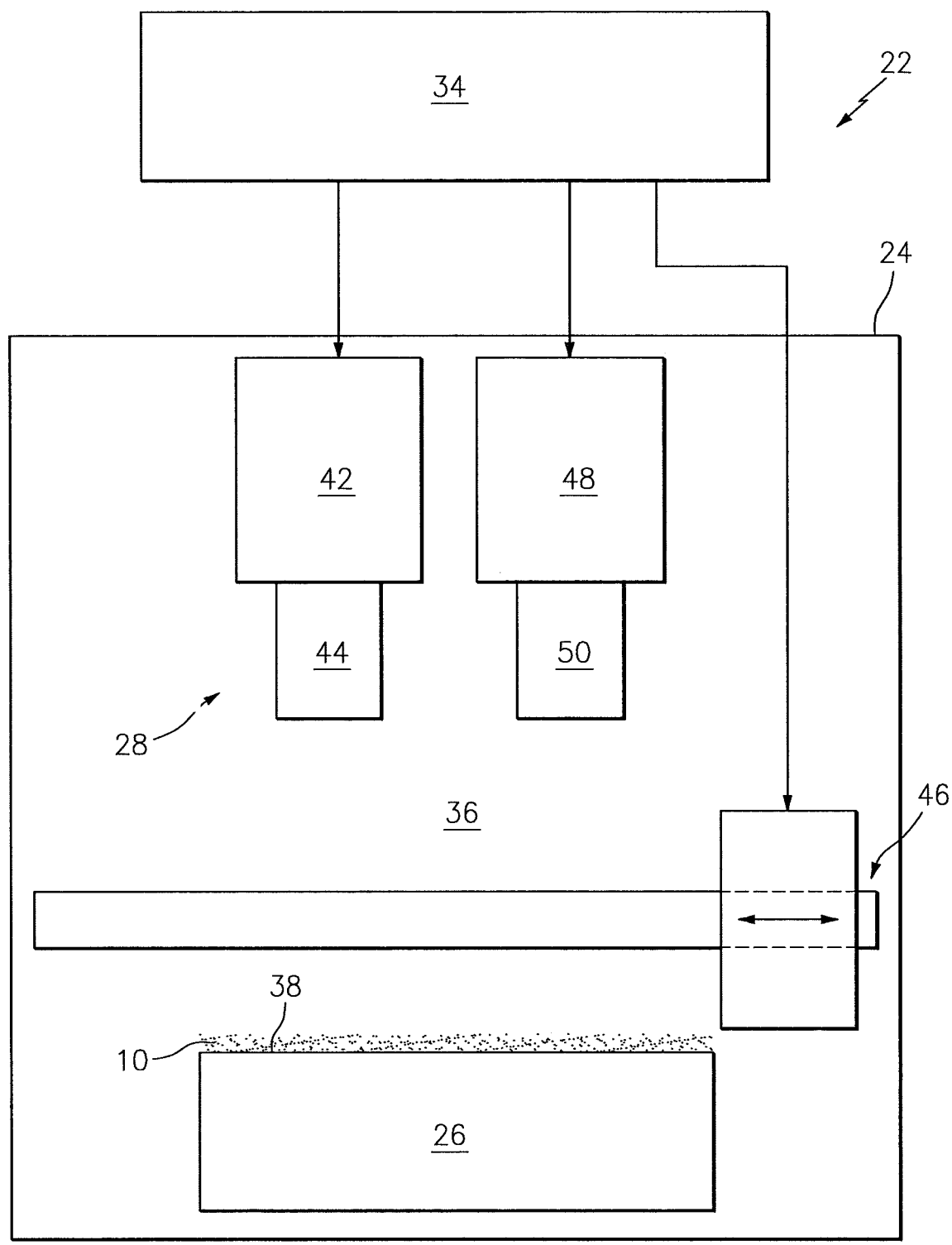

Referring to FIG. 6, the distribution device 28 may also include an additional material reservoir 48 and an additional material outlet 50, which reservoir 48 and outlet 50 may be configured similar to the reservoir 42 and outlet 44 described above. In this embodiment, the reservoir 42 may be adapted to receive and contain a quantity of the first substance particles 16 (e.g., powder). The reservoir 48 may be adapted to receive and contain, in contrast, a quantity of the second substance particles 20 (e.g., powder). The outlets 44 and 50 in turn may be adapted to respectively direct the first substance particles 16 and the second substance particles 20 onto the support surface 38. The outlets 44 and 50 may also be adapted to mix the first and the second substance particles 20 together as the particles are being directed towards and/or on the support surface 38.

Figure 7:
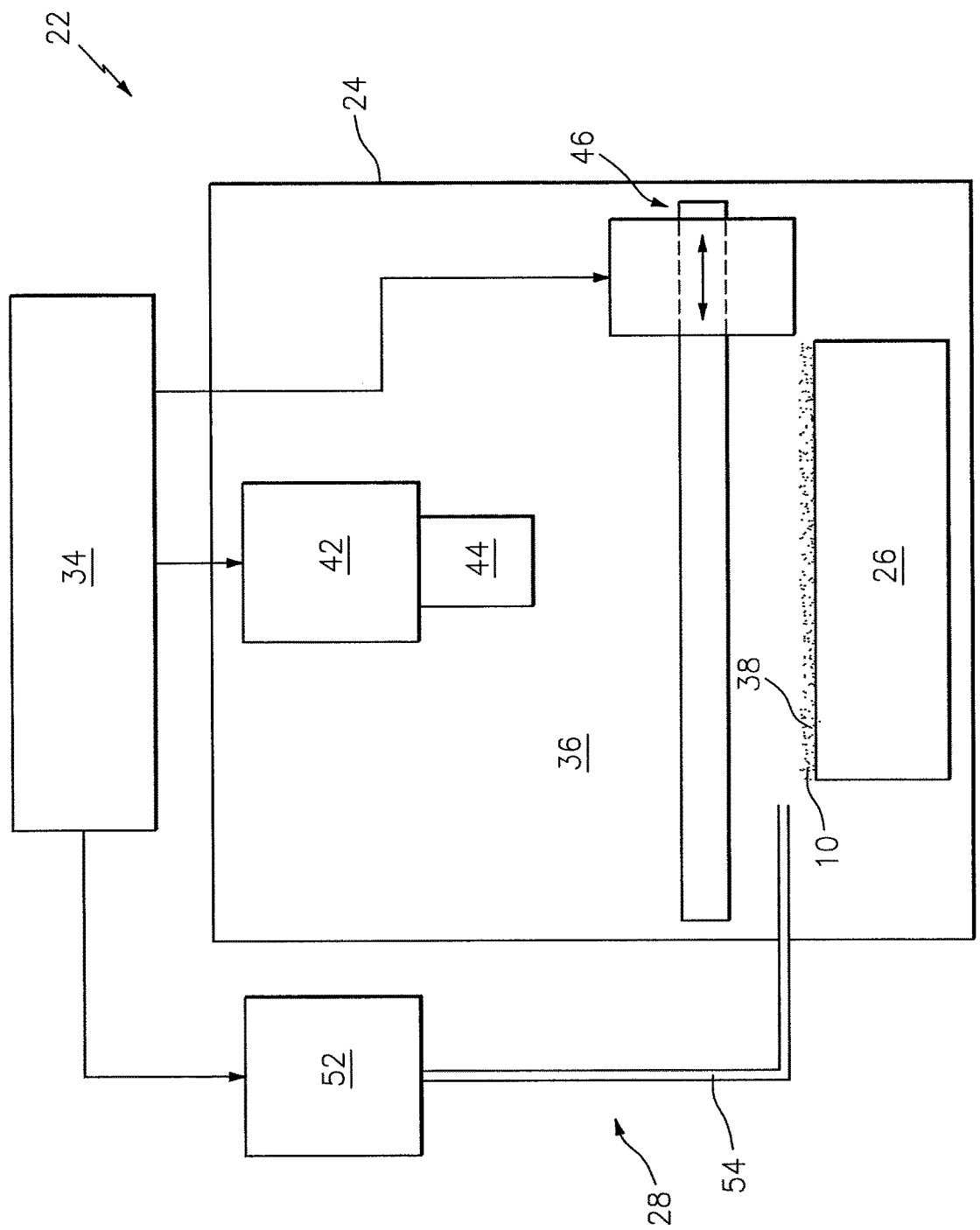

Referring to FIG. 7, the distribution device 28 may also or alternatively include a gas source 52 and a conduit 54. The gas source 52 is adapted the produce and/or store a quantity of second substance 14 gas. The gas source 52 is also adapted to selectively direct a regulated quantity of the second substance 14 gas into the chamber 36 through the conduit 54. This second substance 14 gas may subsequently at least partially encase one or more of the previously deposited first substance particles 16 in a coating 18 of the second substance 14 (see FIG. 2). Of course, various other types and configurations of material distribution devices are known in the art, and the additive manufacturing system 22 is not limited to including any particular ones thereof.

Referring to FIG. 4, the heater 30 is adapted to heat the material 10 and/or the object 40 on the support surface 38. The heater 30 may also be adapted to heat the base 26 and/or the atmosphere within the chamber 36. Briefly, the atmosphere within the chamber 36 may be a Noble gas atmosphere; e.g., an argon (Ar) gas atmosphere.

The heater 30 may include one or more heating devices positioned above the support surface 38, which radiate heat towards the material 10 and/or the object 40. The heater 30 may also or alternatively include one or more heating devices positioned below and/or configured with the base 26. An example of a heating device is an energy beam source (e.g., an electron beam energy source or a laser), which generates and directs an energy beam (e.g., an electron beam or a laser beam) to the material 10 and/or the object 40. Another example of a heating device is a resistance heating element. Of course, various other types and configurations of heaters and heating devices are known in the art, and the additive manufacturing system 22 is not limited to including any particular ones thereof.

The solidification device 32 is adapted to solidify at least a portion or all of the material 10 deposited on or otherwise supported by the support surface 38 to form the object 40. The solidification device 32, for example, may melt at least some of the deposited material 10 using at least one energy beam such that the melted material fuses together to form the object 40.

The solidification device 32 may include at least one energy beam source such as, for example, a laser or an electron beam energy source. The energy beam source is adapted to generate at least one energy beam (e.g., a laser beam or an electron beam) for melting or otherwise fusing a portion of the deposited material together. The energy beam source is also adapted to move the energy beam over (e.g., selectively scan) at least a portion of the deposited material. Of course, various other types and configurations of solidification devices are known in the art, and the additive manufacturing system 22 is not limited to including any particular ones thereof.

The controller 34 (e.g., a processing system) is adapted to signal one or more of the system components 28, 30 and 32 to perform at least a portion of the process described below. The controller 34 may be implemented with a combination of hardware and software. The hardware may include memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 8:
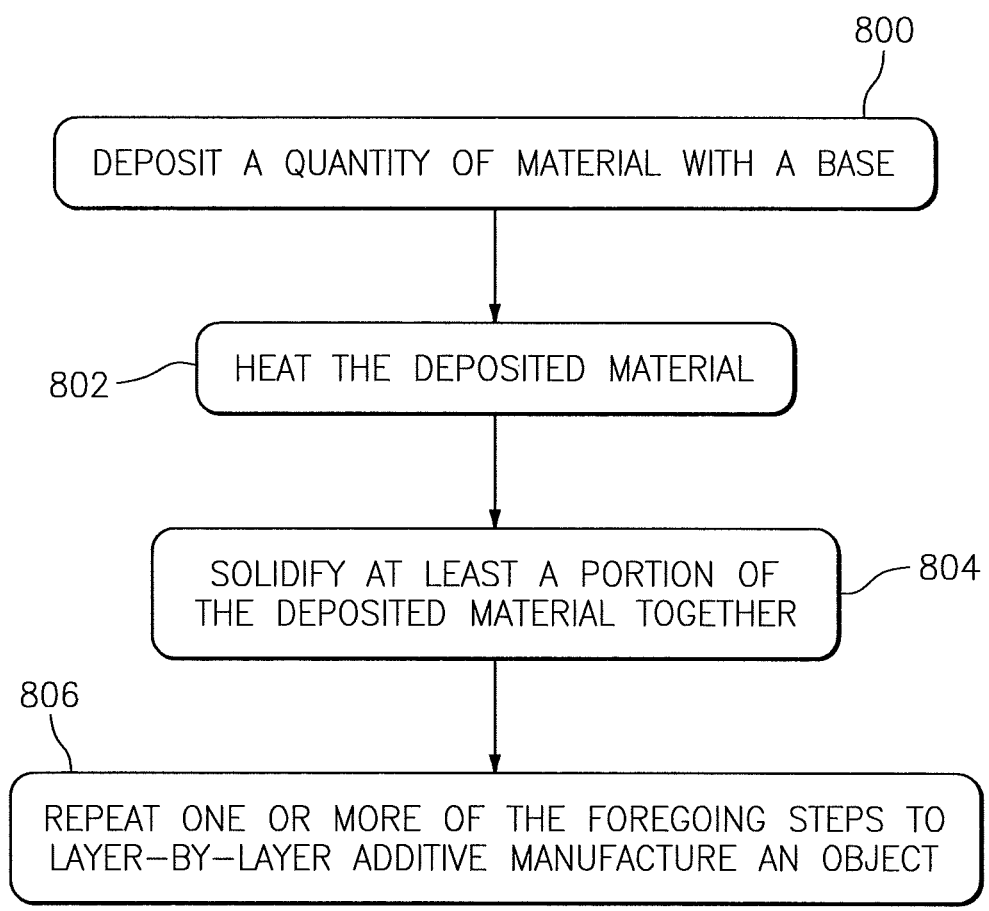
FIG. 8 is a flow diagram of a process for manufacturing at least one part.

FIG. 8 is a flow diagram of a process for manufacturing at least one part using a system such as, for example, the additive manufacturing system 22 of FIG. 4. An example of a part is a rotor blade for a turbine engine such as, for example, a turbine blade, a compressor blade or a fan blade. Other examples of a part include a stator blade for a turbine engine, a guide vane for a turbine engine, a gas path wall for a turbine engine as well as various other components included in a turbine engine. The process of FIG. 8 and the manufacturing system 22, however, may also or alternatively additively manufacture parts other than those described above or included in a turbine engine.

In step 800, the additive manufacturing system 22 deposits or otherwise provides a quantity of the material 10 with the base 26. The controller 34, for example, may signal the distribution device 28 to deposit or otherwise provide a substantially uniform layer of the material 10 over at least a portion of the support surface 38. This layer of material 10 may be deposited directly on the support surface 38. Alternatively, the layer of material 10 may be deposited on at least one layer of material that was previously deposited and/or solidified on the support surface 38.

Referring to FIG. 5, the first substance 12 and the second substance 14 may be collectively deposited into the chamber 36 and with the base 26 to provide the layer of material 10 over the support surface 38. The controller 34, for example, may signal the reservoir 42 to direct a quantity of the material 10 through the outlet 44 to form a mound of the material 10 on the support surface 38. Here, the material 10 directed through the outlet 44 may include one or more of the first substance particles 16 that are at least partially coated with the coating 18 of the second substance 14 as illustrated in FIG. 1. The material 10 directed through the outlet 44 may also or alternatively include a substantially homogeneous mixture of the first substance particles 16 and the second substance particles 20 as illustrated in FIG. 3. Referring again to FIG. 5, the controller 34 may subsequently signal the coater 46 to spread the mound of the material 10 across at least a portion of the support surface 38 to provide the layer of material 10.

Referring to FIGS. 6 and 7, the first substance 12 and the second substance 14 may be independently directed into the chamber 36 and/or deposited with the base 26 to provide the layer of material 10 over the support surface 38. For example, referring to FIG. 6, the controller 34 may signal the reservoir 42 to direct a quantity of the first substance particles 16 through the outlet 44 and toward the base 26. The controller 34 may also signal the reservoir 48 to direct a quantity of the second substance particles 20 through the outlet 50 and toward the base 26. The outlets 44 and 50 may be positioned such that the first and the second substance particles 16 and 20 mix together as the particles travel to the support surface 38. The outlets 44 and 50 may also or alternatively be positioned such that the first and the second substance particles 16 and 20 mix together as the particles collect above the support surface 38 forming a mound. The controller 34 may subsequently signal the coater 46 to spread the mound of the mixed first and second substance particles 16 and 20 (e.g., the material 10) across at least a portion of the support surface 38 to provide the layer of material 10.

In another example, referring to FIG. 7, the controller 34 may signal the reservoir 42 to direct a quantity of the first substance particles 16 through the outlet 44 to form a mound of first substance particles 16 on the support surface 38. The controller 34 may signal the coater 46 to spread the mound of first substance particles 16 across at least a portion of the support surface 38 to provide a layer of first substance particles 16. The controller 34 may subsequently signal the gas source 52 to direct a quantity of the second substance 14 gas into the chamber 36 through the conduit 54. This gas may flow between the first substance particles 16 and forms a full or partial coating 18 of the second substance 14 on some or substantially all of the first substance particles 16 (see FIG. 2). This coating 18 may be applied through, for example, chemical adsorption, physical adsorption and/or covalent bonding. In this manner, the layer of the material 10 is provided with the base 26.

In step 802, referring to FIG. 4, the deposited material 10 and/or previously solidified material are heated to an elevated temperature. The controller 34, for example, may signal the heater 30 to heat the deposited material 10 and/or the previously solidified material to the elevated temperature using the heating device(s) positioned above, below and/or configured with the base 26.

The elevated temperature may be relatively close to (e.g., between about 500° C. and 50° C. below) a melting temperature of the first substance 12 (or the second substance 14). In this manner, energy required by the energy beam is reduced and precision of material melting may be increased during the material solidification step described below. In general, the elevated temperature should be sufficiently below the melting temperature of the first substance 12 (or the second substance 14) to prevent or significantly reduce likelihood of the first substance particles 16 from uncontrollably fusing (e.g., sintering) together. The second substance 14, however, may accommodate relatively high elevated temperatures since the second substance 14 may provide a diffusion barrier between the first substance particles 16 as set forth above. In other embodiments, of course, the elevated temperature may be anywhere between room temperature (e.g., about 20° C.) and the melting point of the first substance 12 or the second substance 14.

In step 804, at least a portion of the deposited material 10 is solidified together. The controller 34, for example, may signal the solidification device 32 to selectively scan its energy beam over at least a portion of the deposited material 10 to form the object 40; e.g., at least a portion of the part. The energy beam may melt the respective material. The melted material may fuse together and thereafter solidify providing a solid mass of object material that forms the object 40.

In step 806, one or more of the foregoing steps (e.g., the steps 800, 802 and 804) may be repeated for one or more iterations in order to additively manufacture the object 40 layer-by-layer. Upon the completion of this step, the object 40 may be a complete additive manufactured part.

The process of FIG. 8 may include one or more additional steps other than those described above. For example, the object 40 may undergo additional manufacturing processes during and/or after the material buildup step. Examples of such additional manufacturing processes may include, but are not limited to, machining, surface finishing, coating, etc. One or more of the steps of the process of FIG. 8 may be performed in a different order. The heat step 802, for example, may be performed during each of the steps of FIG. 8 in order to maintain the atmosphere, the base, the material and/or the object at a stable temperature. In addition, one or more of the steps of the process of FIG. 8 may be omitted. For example, the process of FIG. 8 may be performed without the heating step 802.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A manufacturing process, comprising:
   supporting material within a chamber, the material including a plurality of discrete metal particles and ceramic disposed between at least some of the metal particles, wherein a first of the metal particles is completely encased by a coating of the ceramic; and solidifying at least a portion of the material together using a laser beam or an electron beam generated by an additive manufacturing system to form an object;

wherein a mass fraction of the ceramic within the material is equal to or less than one percent;

wherein the material is supported by a support surface within the chamber; and wherein the solidifying comprises scanning the laser beam or the electron beam over a select portion of the material that is support by the support surface to melt the select portion of the material such that the select portion of the material fuses toqether and thereafter solidifies to form the object.

2. The process of claim 1, wherein the ceramic inhibits the metal particles from sintering together.

3. The process of claim 1, further comprising directing a material particle into the chamber, wherein the material particle includes the first of the metal particles that is completely encased by the coating of the ceramic.

4. The process of claim 1, further comprising completely encasing the first of the metal particles with the coating of the ceramic within the chamber.

5. The process of claim 1, wherein a melting point of the ceramic is higher than a melting point of the metal particles.

6. A manufacturing process, comprising:

providing material that consists of a plurality of particles and a substance at least partially separating at least some of the particles, wherein the substance comprises non-metal, and a first of the particles is completely encased by a coating of the non-metal; and fusing a select portion of the material together to form an object by scanning an energy beam generated by an additive manufacturing system over the select portion of the material to melt the select portion of the material while leaving another portion of the material, which is adjacent to the select portion of the material, as discrete particles; wherein a melting point of the substance is higher than a melting point of the particles; and wherein the mass fraction of the substance within the material is less than one percent.

7. The process of claim 6, wherein the first of the particles comprises metal.

8. The process of claim 6, wherein the non-metal comprises ceramic.

9. The process of claim 1, wherein the at least a portion of the material is solidified together by scanning the laser beam over the at least a portion of the material.

10. The process of claim 1, wherein the at least a portion of the material is solidified together by scanning the electron beam over the at least a portion of the material.

11. The process of claim 1, wherein the object consists of the material.

12. The process of claim 6, wherein the energy beam comprises a laser beam.

\* \* \* \* \*